(12) United States Patent
Kato

(10) Patent No.: US 11,660,941 B2
(45) Date of Patent: May 30, 2023

(54) CAB FOR WORK MACHINE, WORK MACHINE, AND AUTOMATIC OPENING/CLOSING DEVICE

(71) Applicant: KOMATSU LTD., Tokyo (JP)

(72) Inventor: Yasunari Kato, Tokyo (JP)

(73) Assignee: KOMATSU LTD., Tokyo (JP)

( * ) Notice: Subject to any disclaimer, the term of this patent is extended or adjusted under 35 U.S.C. 154(b) by 387 days.

(21) Appl. No.: 17/053,121

(22) PCT Filed: Jul. 5, 2019

(86) PCT No.: PCT/JP2019/026846
§ 371 (c)(1),
(2) Date: Nov. 5, 2020

(87) PCT Pub. No.: WO2020/044794
PCT Pub. Date: Mar. 5, 2020

(65) Prior Publication Data
US 2021/0246705 A1    Aug. 12, 2021

(30) Foreign Application Priority Data

Aug. 31, 2018  (JP) .............................. JP2018-163534

(51) Int. Cl.
*B60J 5/04* (2006.01)
*E05F 15/48* (2015.01)
*B62D 33/06* (2006.01)

(52) U.S. Cl.
CPC ............. *B60J 5/0487* (2013.01); *E05F 15/48* (2015.01); *B62D 33/06* (2013.01)

(58) Field of Classification Search
CPC .... E05F 15/48; B60J 5/0487; E05Y 2900/518
USPC .......................................... 296/190.11, 146.4
See application file for complete search history.

(56) References Cited

U.S. PATENT DOCUMENTS

| | | | | |
|---|---|---|---|---|
| 3,967,850 | A * | 7/1976 | Whisler ................. | B60J 5/0487 292/338 |
| 4,957,324 | A * | 9/1990 | Doescher .............. | E02F 9/0833 296/190.11 |
| 5,504,974 | A * | 4/1996 | Graber .................... | E05B 85/14 49/141 |
| 8,496,282 | B2 * | 7/2013 | Murakami ............ | E05B 1/0015 296/65.05 |
| 11,359,430 | B2 * | 6/2022 | Linden .................... | E05F 15/73 |
| 11,376,929 | B2 * | 7/2022 | Pennings ................ | E05B 83/36 |

(Continued)

FOREIGN PATENT DOCUMENTS

| | | |
|---|---|---|
| CN | 107532406 A | 1/2018 |
| DE | 202005014891 U1 | 2/2007 |

(Continued)

*Primary Examiner* — Jason S Morrow
(74) *Attorney, Agent, or Firm* — Faegre Drinker Biddle & Reath LLP

(57) ABSTRACT

A cab for a work machine includes a cab body that is formed with a doorway, a door that is rotatably supported on the cab body so as to open and close the doorway, an actuator that generates a driving force to open and close the door, a rod that is attached to the door and rotatable relative to the door, and a sensor that is attached to the door separately from the rod. The sensor detects the motion of the rod relative to the door by detecting the motion of the rod relative to the sensor.

11 Claims, 8 Drawing Sheets

(56) References Cited

U.S. PATENT DOCUMENTS

| | | | |
|---|---|---|---|
| 11,420,689 B2 * | 8/2022 | Schabner | E05B 79/12 |
| 2008/0236044 A1 | 10/2008 | Kraus et al. | |
| 2015/0283886 A1 * | 10/2015 | Nania | E05F 15/73 49/31 |
| 2015/0330133 A1 * | 11/2015 | Konchan | E05B 81/76 296/146.4 |
| 2018/0100289 A1 | 4/2018 | Hamaguchi et al. | |
| 2020/0181966 A1 * | 6/2020 | Kato | B60R 3/02 |
| 2020/0354925 A1 * | 11/2020 | Kato | B60J 5/047 |
| 2021/0277703 A1 * | 9/2021 | Marshall | E05F 15/73 |

FOREIGN PATENT DOCUMENTS

| | | |
|---|---|---|
| FR | 2484515 A1 | 12/1981 |
| GB | 1189118 A | 4/1970 |
| JP | H11-182136 A | 7/1999 |
| JP | 2005-351017 A | 12/2005 |
| JP | 2007-223537 A | 9/2007 |
| JP | 2008-044717 A | 2/2008 |
| JP | 2012-219522 A | 11/2012 |
| JP | 2016-179766 A | 10/2016 |
| JP | 2017-043888 A | 3/2017 |
| KR | 10-2010-0071363 A | 6/2010 |
| WO | WO 2007/019836 A1 | 2/2007 |

* cited by examiner

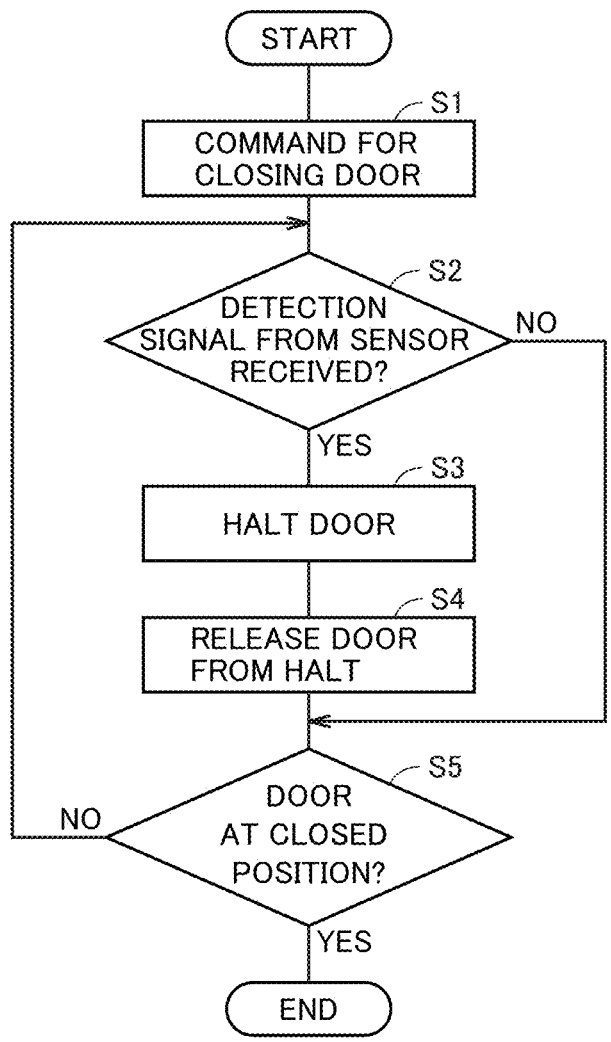

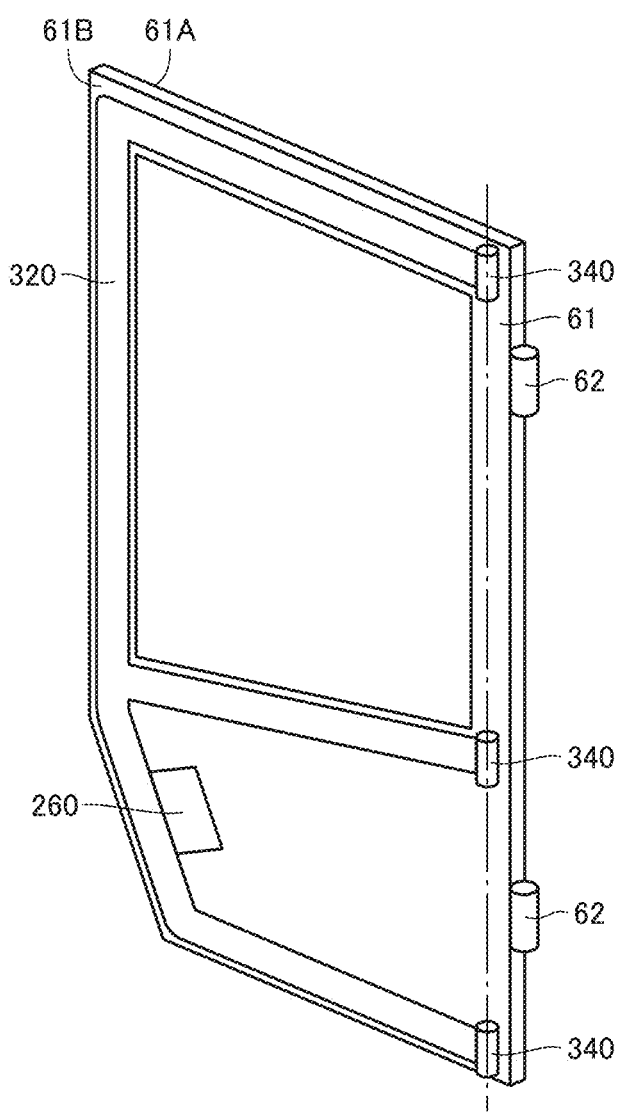

CAB FOR WORK MACHINE, WORK MACHINE, AND AUTOMATIC OPENING/CLOSING DEVICE

TECHNICAL FIELD

The present disclosure relates to a cab for a work machine, a work machine including the cab, and an automatic opening/closing device.

BACKGROUND ART

Japanese Patent Laying-Open No. 11-182136 (PTL 1) discloses an automatic opening/closing device that automatically opens and closes a door of a vehicle. The automatic opening/closing device includes a pressure-sensitive sensor that detects a pressure in a direction opposite to the moving direction of the door, and the pressure-sensitive sensor detects that a foreign substance is present on the moving trajectory of the door by detecting a counter force from the foreign substance when the foreign substance is pressed by the pressure-sensitive sensor.

CITATION LIST

Patent Literature

PTL 1: Japanese Patent Laying-Open No. 11-182136

SUMMARY OF INVENTION

Technical Problem

In the configuration disclosed in the above document, the pressure-sensitive sensor includes an outer cover which is made of an elastic material such as rubber or soft synthetic resin, and a plurality of electrodes housed inside the outer cover. The pressure-sensitive sensor detects the presence of a foreign substance when the electrodes are bent to come into contact with each other and become short-circuited. However, if the outer cover is damaged by the foreign substance and one or more electrodes are broken, the pressure-sensitive sensor is unable to function normally. Since the outer cover is made of an elastic material, the pressure sensitive sensor may not be used in a severe environment such as a high temperature environment, an acid environment or an alkaline environment. Therefore, there is a room for further improving the durability of the device for detecting a foreign substance.

The present disclosure provides a cab for a work machine, a work machine, and an automatic opening/closing device in which the durability of a device for detecting a foreign substance is improved.

Solution to Problem

According to an aspect of the present disclosure, there is provided a cab for a work machine. The cab includes cab body that is formed with a doorway, a door that is rotatably supported on the cab body so as to open and close the doorway, an actuator that generates a driving force to open and close the door, a movable member that is attached to the door and movable relative to the door, and a sensor that is attached to the door separately from the movable member. The sensor detects the motion of the movable member relative to the door by detecting the motion of the movable member relative to the sensor.

According to an aspect of the present disclosure, there is provided an automatic opening/closing device that automatically opens and closes a door rotatably supported on a cab body of a work machine. The automatic opening/closing device includes an actuator that generates a driving force to open and close the door, a movable member that is attached to the door and movable relative to the door, and a sensor that is attached to the door separately from the movable member so as to detect the motion of the movable member relative to the door.

Advantageous Effects of Invention

According to the present disclosure, it is possible to improve the durability of the device for detecting a foreign substance.

BRIEF DESCRIPTION OF DRAWINGS

FIG. 7 is a flowchart illustrating an operation of automatically closing a door; and FIG. 8 is a perspective view schematically illustrating a movable member and a sensor which are attached to the outside of the door.

DESCRIPTION OF EMBODIMENTS

Figure 1:
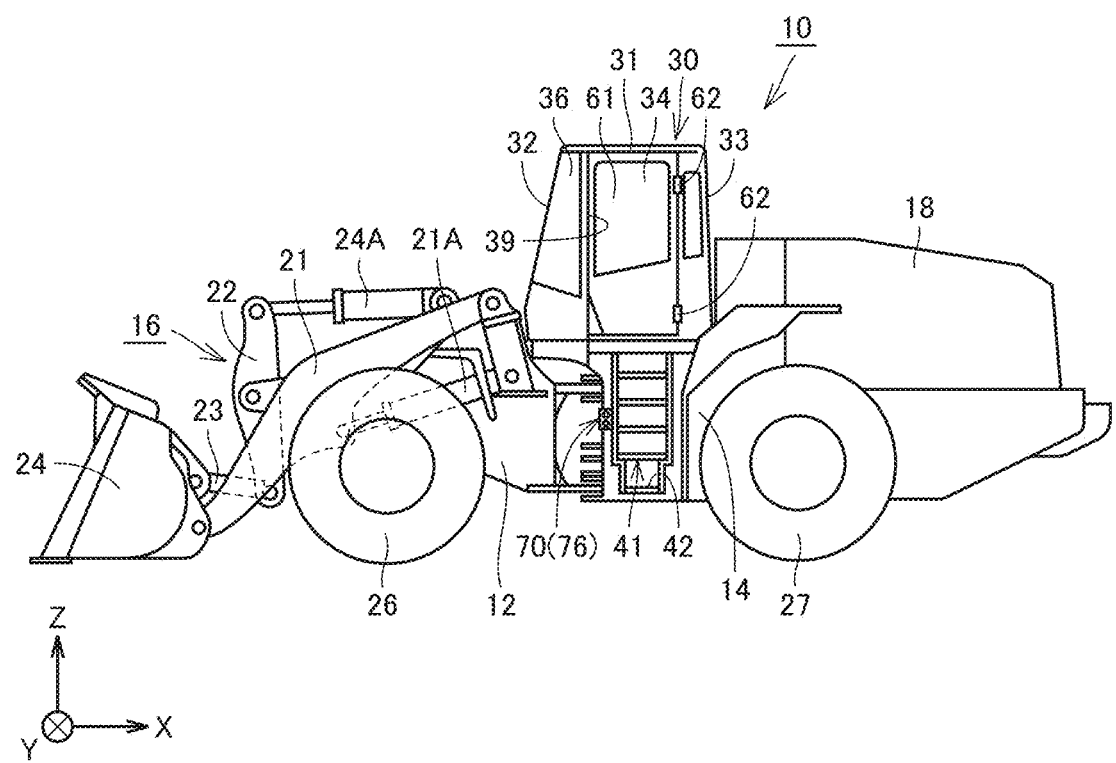
FIG. 1 is a side view illustrating a wheel loader according to an embodiment of the present disclosure.

Hereinafter, embodiments will be described with reference to the drawings. In the following description, the same components will be denoted by the same reference numerals, and may have the same names and the same functions, and thereby, the detailed description thereof will not be repeated.

[Overall Configuration]

In the present embodiment, the configuration of a wheel loader which serves as an example of a work machine to which the idea of the present disclosure may be applied will be described firstly. FIG. 1 is a side view illustrating a wheel loader 10 according to an embodiment of the present disclosure.

As illustrated in FIG. 1, the wheel loader 10 includes a front frame 12, a rear frame 14, front wheels 26, rear wheels 27, a work implement 16, a cab (an operator's compartment) 30, and a rear structure 18.

In the following description, the direction in which the wheel loader 10 travels straight is defined as a front-rear direction of the wheel loader 10. In the front-rear direction of the wheel loader 10, the side on which the work implement 16 is disposed relative to the front frame 12 and the rear frame 14 is defined as a front side, and the side opposite to the front side is defined as a rear side. The left-right direction of the wheel loader 10 is defined as a direction orthogonal to the front-rear direction in planar view. The right side and the left side in the left-right direction in a viewing angle toward the front direction correspond to the right direction and the left direction, respectively. The vertical direction of the wheel loader 10 is defined as a direction orthogonal to a plane defined by the front-rear direction and the left-right direction. In the vertical direction, the side downward the ground is defined as a lower side, and the side upward the sky is defined as an upper side.

The front-rear direction corresponds to the front-rear direction of the operator sitting on a driver's seat in the cab 30. The left-right direction corresponds to the left-right direction of the operator sitting on the driver's seat. The left-right direction corresponds to the width direction of the wheel loader 10. The vertical direction corresponds to the vertical direction of the operator sitting on the driver's seat. The direction facing the operator sitting on the driver's seat corresponds to the front direction, and the direction behind the operator sitting on the driver's seat corresponds to the rear direction. The right side and the left side when the operator is sitting on the driver's seat and facing toward the front correspond to the right direction and the left direction, respectively. The side down to the feet of the operator sitting on the driver's seat corresponds to the lower side, and the side upper to the head corresponds to the upper side.

In FIG. 1, the front-rear direction is indicated by an arrow X, the left-right direction is indicated by an arrow Y, and the vertical direction is indicated by an arrow Z.

The front frame 12 and the rear frame 14 constitute an articulate body frame. The front frame 12 is provided in front of the rear frame 14. The front frame 12 is rotatably coupled to the rear frame 14 by a center pin (not shown). The center of rotation of the front frame 12 relative to the rear frame 14 corresponds to an axis extending in the vertical direction.

The front frame 12 is coupled to the rear frame 14 via steering cylinders (not shown). The steering cylinders are provided in pairs on the left side and the right side, respectively. The front frame 12 rotates to the left side or to the right side about the center pin as one steering cylinder extends and the other steering cylinder contracts or vice versa.

The front wheels 26 and the rear wheels 27 are travelling wheels of the wheel loader 10. The front wheels 26 are provided on the front frame 12. The front wheels 26 are provided in pairs on the left side and the right side, respectively. The rear wheels 27 are provided on the rear frame 14. The rear wheels 27 are provided in pairs on the left side and the right side, respectively.

The work implement 16 is provided on the front frame 12. The work implement 16 includes a boom 21, a bucket 24, a boom cylinder 21A, a bell crank 22, a bucket cylinder 24A, and a link 23.

The cab 30 and the rear structure 18 are provided on the rear frame 14. The cab 30 is provided behind the work implement 16. The operator enters the room of the cab 30 and operates the wheel loader 10. The operator gets into the cab 30 so as to drive the wheel loader 10 and operate the work implement 16.

The rear structure 18 is provided behind the cab 30. The rear structure 18 includes a hydraulic oil tank, an engine, a hydraulic pump, and the like. The front frame 12, the rear frame 14 and the rear structure 18 constitute the body of the wheel loader 10.

[Configuration of Cab 30]

Next, the configuration of the cab 30 will be described. The cab 30 includes a cab body 31. The cab body 31 defines an interior space of the cab 30. The cab body 31 is formed by assembling steel plates and transparent windows in combination.

The cab body 31 has a hexagonal shape in top view. The cab body 31 includes a front surface 32, a rear surface 33, a left surface 34, a right surface, a diagonally left front surface 36, and a diagonally right front surface.

The front surface 32 is provided facing forward. The rear surface 33 is provided facing rearward. The length of the front surface 32 in the left-right direction is shorter than the length of the rear surface 33 in the left-right direction. The right surface is provided facing rightward. The right surface is disposed between the front surface 32 and the rear surface 33. The right surface is continuous with the right end of the rear surface 33. The left surface 34 is provided facing leftward. The left surface 34 is disposed between the front surface 32 and the rear surface 33. The left surface 34 is continuous with the left end of the rear surface 33.

The diagonally left front surface 36 is provided facing diagonally left forward. The diagonally left front surface 36 is disposed between the front surface 32 and the left surface 34. The diagonally left front surface 36 is continuous with the left end of the front surface 32 and the front end of the left surface 34. The diagonally right front surface is provided facing diagonally right forward. The diagonally right front surface is disposed between the front surface 32 and the right surface. The diagonally right front surface is continuous with the right end of the front surface 32 and the front end of the right surface. The distance between the diagonally left front surface 36 and the diagonally right front surface in the left-right direction decreases from the rear side toward the front side.

The cab body 31 of the cab 30 is not limited to the hexagonal shape in top view as described above, and it may have, for example, a rectangular shape in top view.

The cab 30 includes a left door 61 and a right door. Both the left door 61 and the right door are provided on the cab body 31 so that they may be opened or closed as necessary. The left door 61 is provided on the left side of the cab body 31. The door 61 is provided on the left surface 34. The door 61 is an automatic door that may be opened and closed automatically. The right door is provided on the right side of the cab body 31. The right door is provided on the right surface. The right door is a manual door that may be opened and closed manually.

[Configuration of Door 61]

Next, the configuration of the door 61 and the configuration around the door 61 will be described.

The cab body 31 is formed with a doorway 39. The doorway 39 is an entrance provided in the cab body 31 for the operator to get in and out of the cab 30. The doorway 39 has a substantially rectangular shape as a whole in which the vertical direction corresponds to the longitudinal direction. The doorway 39 is provided on the left surface 34 and the right surface, respectively.

The door 61 is provided for the doorway 39 which is provided on the left surface 34. The door 61 may be rotated between a closed position (a position illustrated in FIG. 1 and FIG. 2 to be described later) in which the doorway 39 is closed and an open position in which the doorway 39 is opened. The door 61 is configured to open and close the doorway 39.

The door 61 includes a hinge 62. The door 61 is rotatably supported on the cab body 31 via the hinge 62. The door 61 is configured to be rotatable around the hinge 62 between the closed position and the open position. The door 61 is configured to open outward from the cab 30. The door 61 is a rear hinge door in which the hinge 62 is arranged at the rear edge of the doorway 39.

The hinge axis of the hinge 62 serves as the center of rotation of the door 61. The center of rotation of the door 61 extends in the vertical direction. The center of rotation of the door 61 is provided at the rear edge of the door 61. The door 61 is rotatably supported on the cab body 31 about the rear edge of the doorway 39.

The rotation angle of the door 61 from the closed position to the open position is greater than 90°. Preferably, the rotation angle of the door 61 from the closed position to the open position is 120° or more.

When the door 61 is at the closed position, the door 61 is parallel to the left surface 34. When the door 61 is at the open position, the door 61 extends diagonally left rearward from the rear edge of the opening formed by the doorway 39. The door 61 at the open position is located rearward than the doorway 39.

The wheel loader 10 further includes a ladder 41. The cab 30 is arranged above the ladder 41. The ladder 41 is used by the operator to move up and down between the ground and the cab 30.

The ladder 41 is attached to the rear frame 14. The ladder 41 includes a plurality of steps 42. Each step 42 serves as a foothold on which the operator steps. The plurality of steps 42 are arranged at an interval in the vertical direction.

[Configuration of Opening/Closing Device for Door 61]

Figure 2:
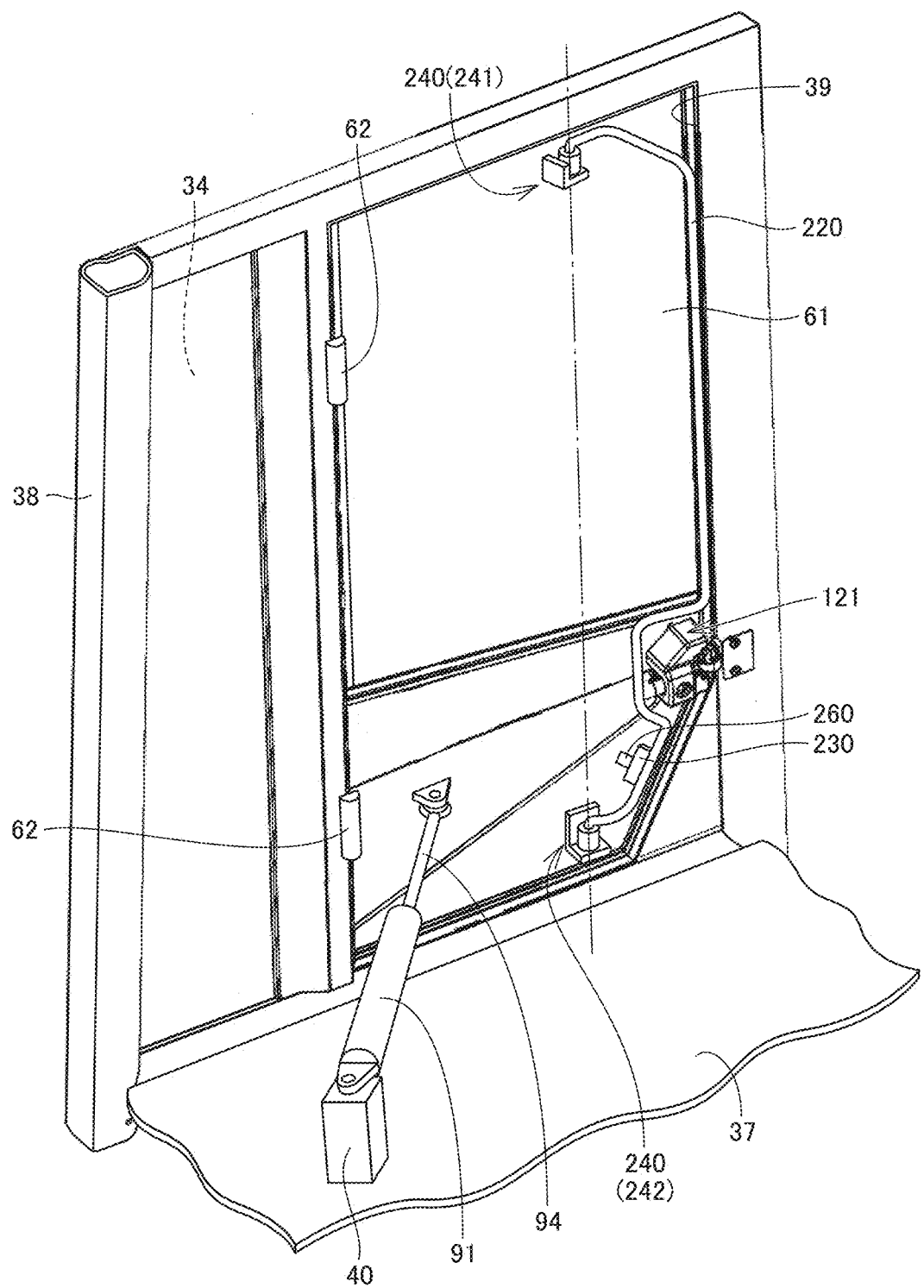
FIG. 2 is a perspective view of a door at a closed position when viewed from the inside of a cab.

Next, the configuration of a device automatically opening and closing the door 61 will be described. FIG. 2 is a perspective view illustrating the door 61 at the closed position when viewed from the inside of the cab 30. As illustrated in FIG. 2, the wheel loader 10 further includes an actuator 91. The actuator 91 generates a driving force to move the closed door 61 in the opening direction. The actuator 91 performs an opening operation on the door 61. The opening operation refers to such an operation that the door 61 is moved from the closed position to the open position. The actuator 91 further generates a driving force to move the opened door 61 in the closing direction. The actuator 91 performs a closing operation on the door 61. The closing operation refers to such an operation that the door 61 is moved from the open position to the closed position. The actuator 91 may be an electric actuator.

The actuator 91 is a linear actuator, and includes a rod 94. The rod 94 can do reciprocating motion, and the length of the rod 94 protruding from the actuator 91 is extendable. The actuator 91 is supported by the cab body 31. As illustrated in FIG. 2, a bracket 40 is fixed on a floor 37 of the cab body 31. The bracket 40 is formed with a through hole, and the actuator 91 is provided with a coupling pin inserted through the through hole. Thus, the actuator 91 is fixed to the bracket 40 in such a manner that it is rotatable about the coupling pin. The actuator 91 is supported on the cab body 31.

The distal end of the rod 94 of the actuator 91 is attached to the inner surface of the door 61. Thus, the actuator 91 is pivotably attached to the door 61.

As illustrated in FIG. 1, the wheel loader 10 further includes an operation unit 70. The operation unit 70 is operated by the operator when the operator opens or closes the door 61. The operation unit 70 includes, for example, a push button to be pressed by the operator. The operation unit 70 may include an open button for opening the door 61 and a close button for closing the door 61.

The operation unit 70 includes a first operation unit (not shown) provided inside the cab 30 and a second operation unit 76 provided outside the cab 30. The first operation unit is used by the operator to open or close the door 61 from the inside of the cab 30. The first operation unit is attached to, for example, a right front pillar of the cab 30. The second operation unit 76 is used by the operator to open or close the door 61 from the outside of the cab 30. The second operation unit 76 is attached to the ladder 41.

As illustrated in FIG. 2, the wheel loader 10 further includes a closed position locking unit 121. The closed position locking unit 121 is configured to lock the door 61 at the closed position. The closed position locking unit 121 is provided inside the cab 30.

[Configuration of Foreign Substance Detection Device]

The wheel loader 10 according to an embodiment includes a foreign substance detection device configured to detect whether or not a foreign substance is present on the moving trajectory of the door 61 during the closing operation of the door 61. The foreign substance detection device includes a rod 220.

The rod 220 is made of a hard material, typically a metal material such as steel. An elastic material such as resin or rubber may be provided around the hard material. The rod 220 is a cylindrical bar bent at both ends. The rod 220 is supported by a rod support 240. The rod support 240 is fixed to the inner surface of the door 61. The rod support 240 includes an upper support 241 and a lower support 242. An upper end of the rod 220 is supported by the upper support 241. A lower end of the rod 220 is supported by the lower support 242. The rod 220 is attached to the inner surface of the door 61 via the rod support 240.

The upper support 241 and the lower support 242 are arranged between the front edge and the rear edge of the door 61 in the front-rear direction. The upper support 241 and the lower support 242 are arranged at the same position in the front-rear direction. The rod 220 is arranged in front of the upper support 241 and the lower support 242. The hinge 62 (FIG. 1), which serves as the center of rotation of the door 61, is provided at the rear edge of the door 61, and the rod 220 is attached to the door 61 at a position away from the center of rotation of the door 61.

The rod 220 has a portion arranged to extend along the front edge of the door 61. The front edge and the rear edge of the door 61 extend in the vertical direction substantially along a rotation axis which serves as the center of rotation of the door 61 relative to the cab body 31. The portion of the rod 220 is arranged closer to the front edge of the door 61 which is located away from the rotation axis of the door 61 further than the rear edge of the door 61. The upper support 241 and the lower support 242 are fixed to the door 61 at positions closer to the front edge of the door 61 than to the rear edge of the door 61 in the front-rear direction. The rod 220 is provided near the distal end of the door 61 rotating relative to the cab body 31.

Figure 3:
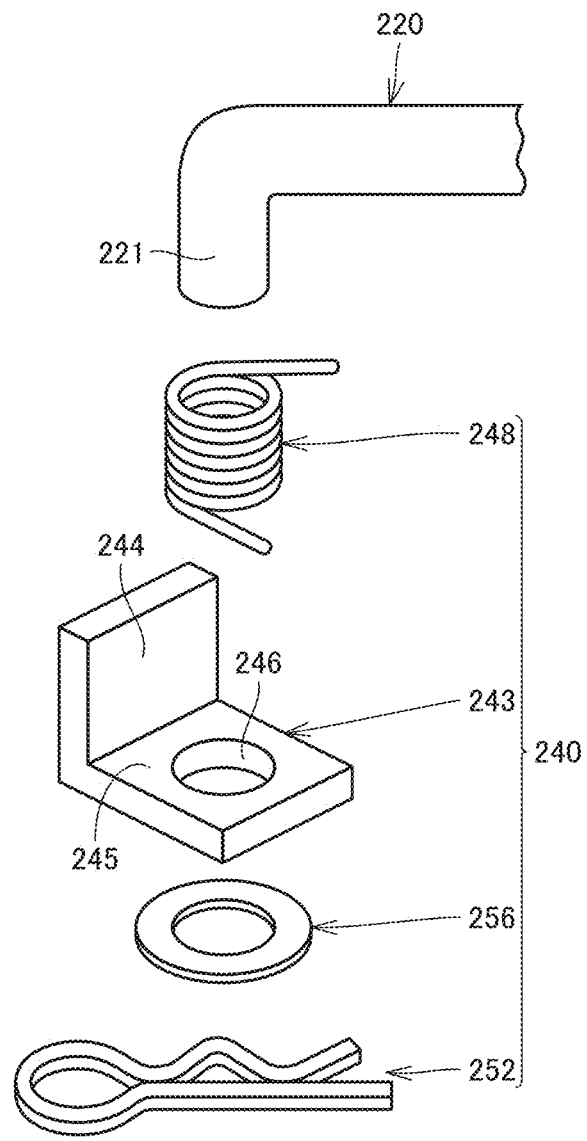
FIG. 3 is an exploded perspective view illustrating a support structure for supporting a movable member.

FIG. 3 is an exploded perspective view illustrating a support structure for supporting a movable member. FIG. 3 illustrates a part of the rod 220 illustrated in FIG. 2, specifically, a rod end 221 of the rod 220, and a rod support 240 which serves as a support structure supporting the rod end 221. The rod support 240 supports the upper end and the lower end of the rod 220. Both the upper end and the lower end of the rod 220 are bent downward to form an L-shape.

As illustrated in FIG. 3, the rod support 240 includes a fixation member 243. The fixation member 243 of the rod support 240 is fixed to the inner surface of the door 61 by welding, for example. The fixation member 243 includes a fixation portion 244 to be fixed to the door 61 and a support portion 245 configured to support the rod 220. The fixation portion 244 and the support portion 245 each have a flat plate shape. The fixation portion 244 and the support portion 245 are substantially orthogonal to each other. Since the fixation portion 244 is fixed to the inner surface of the door 61, the fixation portion 244 extends substantially parallel to the inner surface of the door 61. The support portion 245 extends substantially perpendicular to the inner surface of the door 61. The fixation portion 244 and the support portion 245 are joined to each other at respective edges to form an integral unit.

The support portion 245 is formed with a through hole 246 which penetrates the support portion 245 in the thickness direction. The through hole 246 is formed to have a circular shape in planar view. The through hole 246 is formed to have a diameter larger than the diameter of the cylindrical bar forming the rod 220. When the rod 220 is supported by the rod support 240 as illustrated in FIG. 2, the rod end 221 is inserted into the through hole 246 from above.

The rod support 240 includes a torsion spring 248. The torsion spring 248 is mounted on the upper surface of the support portion 245, which facilitates the attachment of the torsion spring 248. Since the torsion spring 248 is supported by the support portion 245, the torsion spring 248 is prevented from falling by its own weight.

When the rod 220 is supported by the rod support 240 as illustrated in FIG. 2, the rod end 221 penetrates through the torsion spring 248. The torsion spring 248 applies a biasing force to the rod 220 so as to bias the rod 220 in a direction away from the door 61. The biasing force applied by the torsion spring 248 may be appropriately adjusted so as to prevent the rod 220 from fluttering when the wheel loader 10 travels and allow the rod 220 to be rotated with a small force. The biasing force may be adjusted by changing the mounting position of each or both arms of the torsion spring 248.

The rod support 240 further includes a beta-shaped pin 252 and a washer 256. The beta-shaped pin 252 and the washer 256 are disposed below the bottom face of the support portion 245. When the rod 220 is supported by the rod support 240 as illustrated in FIG. 2, the beta-shaped pin 252 and the washer 256 are engaged with the tip of the rod end 221. The beta-shaped pin 252 and the washer 256 function to prevent the rod end 221 from falling out of the through hole 246.

When the rod 220 is supported by the rod support 240, the rod 220 is rotatable relative to the rod support 240. The upper support 241 and the lower support 242 are aligned in the vertical direction so that the respective through holes 246 are concentric with each other. A dashed line illustrated in FIG. 2 represents a straight line that passes through the through hole 246 of the upper support 241 and the through hole 246 of the lower support 242. The straight line extends in the vertical direction. The straight line indicates the center of rotation of the rod 220 relative to the door 61. The rod 220 is rotatable relative to the door 61. The center of rotation of the rod 220 relative to the door 61 is different from the center of rotation of the door 61, i.e., the hinge axis. The rod 220 is attached to the door 61 such that it is rotatable relative to the door 61. The rod 220 corresponds to the movable member according to an embodiment.

Referring back to FIG. 2, the foreign substance detection device further includes a plate 230 and a sensor 260. The plate 230 has a flat shape. The plate 230 is fixed to the rod 220 so as to form an integral unit with rod 220. When the rod 220 is rotated relative to the door 61, the plate 230 moves relative to the door 61. The plate 230 is fixed to the rod 220 only at a portion of the rod 220 in the longitudinal direction thereof.

Figure 4:
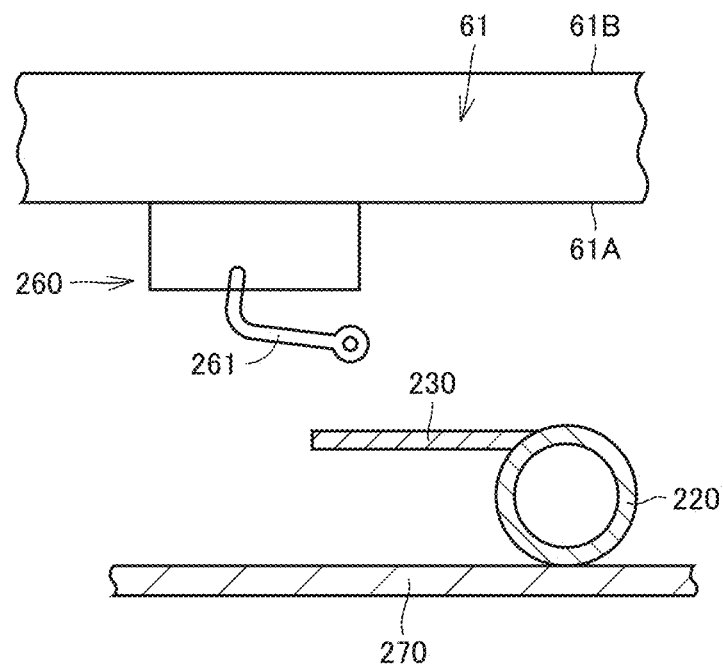
FIG. 4 is a partial cross-sectional view illustrating a state where the movable member is halted relative to the door.

The sensor 260 is attached to the door 61. The sensor 260 is separate from the rod 220. FIG. 4 is a partial cross-sectional view illustrating a state where the movable member is halted relative to the door 61. The door 61 has an inner surface 61A facing the indoor space of the cab 30 when the door 61 is closed relative to the cab body 31, and an outer surface 61B opposite to the inner surface 61A. The outer surface 61B faces the exterior space of the cab 30 when the door 61 is closed relative to the cab body 31.

The sensor 260 is fixed to the inner surface 61A of the door 61. Referring also to FIG. 2, the rod 220 is rotatably attached to the inner surface 61A of the door 61. As illustrated in FIG. 4, the sensor 260 is disposed away from the rod 220.

The sensor 260 has a sensor head 261. The plate 230 is disposed to face the sensor head 261. The plate 230 is disposed at a position overlapping with the sensor head 261 when viewed in the thickness direction of the door 61 (the vertical direction in FIG. 4).

As illustrated in FIG. 4, the wheel loader 10 according to an embodiment further includes a cover 270. The cover 270 is fixed on the inner surface 61A of the door 61. The cover 270 is configured to be immobile relative to the door 61. The cover 270 has a plate shape. The cover 270 is arranged parallel to the inner surface 61A with a distance from the inner surface 61A of the door.

The cover 270 is configured to cover at least the plate 230 and the sensor 260. The cover 270 is disposed so as to overlap with the plate 230 and the sensor 260 when viewed in the thickness direction of the door 61. In the thickness direction of the door 61, the plate 230 and the sensor 260 are arranged between the inner surface 61A of the door 61 and the cover 270.

As illustrated in FIG. 4, the rod 220 is in contact with the cover 270. As described with reference to FIG. 3, the rod 220 is biased by the torsion spring 248 in a direction away from the door 61. The cover 270 inhibits the motion of the rod 220 in the direction away from the door 61. The cover 270 defines a movable range of the rod 220. The cover 270 limits an amount of the rod 220 protruding into the indoor space of the cab 30 so as to prevent the rod 220 from approaching excessively close to the operator seated in the cab 30.

The door 61 has a window portion which is made of a transparent material and formed at an upper part of the door, and a non-window portion which is made of a non-transparent material and formed at a lower part of the door. The plate 230 is arranged facing the non-window portion. The sensor 260 and the cover 270 are attached to the non-window portion. The plate 230, the sensor 260 and the cover 270 are arranged at a lower part of the door 61. The plate 230, the sensor 260 and the cover 270 are arranged at appropriately positions such that the plate 230, the sensor 260 and the cover 270 do not block the operator seated in the cab 30 from viewing the outside of the cab 30.

Figure 5:
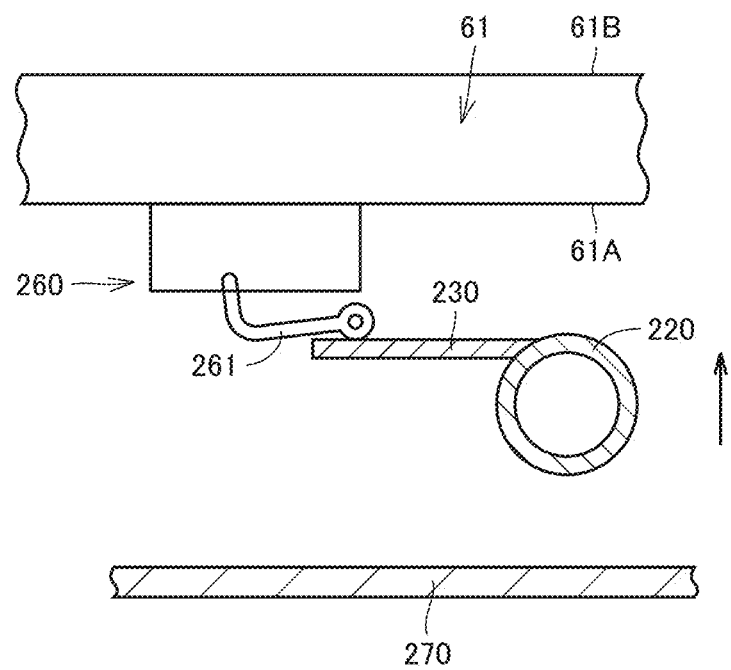
FIG. 5 is a partial cross-sectional view illustrating a state where the movable member is moved relative to the door.

FIG. 5 is a partial cross-sectional view illustrating a state where the movable member is moved relative to the door 61. When the rod 220 is rotated relative to the door 61 about the one-dot chain line illustrated in FIG. 2, the rod 220 approaches the door 61 as illustrated by the arrow in FIG. 5. Since the plate 230 is fixed to the rod 220, the plate 230 approaches the door 61 together with the rod 220. The plate 230 engages with the sensor head 261 of the sensor 260, and moves the sensor head 261.

The motion of the sensor head 261 actuates the sensor 260. In this way, the sensor 260 detects the motion of the rod 220 relative to the sensor 260, specifically the motion of the rod 220 approaching the sensor 260, thereby detecting the motion of the rod 220 relative to the door 61.

The sensor 260 is, for example, a limit switch. The sensor 260 may be a proximity sensor or a pressure sensor. The sensor 260 may be any type of sensor as long as it can detect the motion of the movable member relative to the door 61.

[System Configuration of Opening/Closing Device of Door 61]

Figure 6:
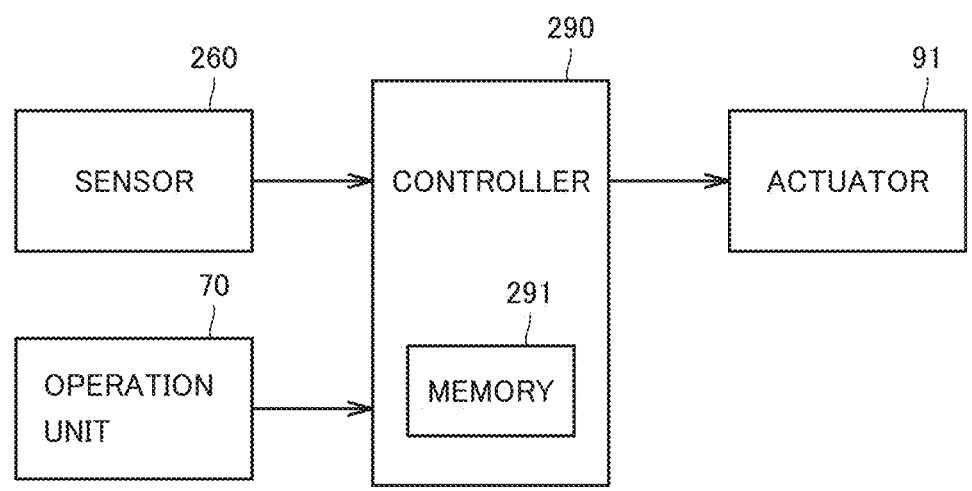
FIG. 6 is a diagram illustrating functional blocks of an automatic opening/closing device according to an embodiment.

FIG. 6 is a diagram illustrating functional blocks of an automatic opening/closing device according to an embodiment. As illustrated in FIG. 6, the wheel loader 10 according to the embodiment further includes a controller 290. The controller 290 has a memory 291. The memory 291 is provided as a space to store a program that causes the automatic opening/closing device of the door 61 to perform various operations and store necessary data. The controller 290 performs various processes for controlling automatic operations of opening and closing the door 61 based on the program stored in the memory 291.

The controller 290 receives, from the sensor 260, a signal on whether or not the rod 220 is moved relative to the door 61. The controller 290 receives a signal from the operation unit 70 indicating that an operation of opening or closing the door 61 is performed by the operator. The controller 290 outputs a command signal to the actuator 91 so as to control the operation of opening or closing the door 61.

[Operation of Closing Door 61]

Next, an operation of closing the door 61 will be described. FIG. 7 is a flowchart illustrating an operation of automatically closing the door 61.

First, in step S1, a command for closing the door 61 is output. The controller 290 receives a signal input from the operation unit 70 when the operator performs an operation to close the door 61. Upon receipt of the signal input from the operation unit 70, the controller 290 outputs a command signal to the actuator 91 to reduce the protruding length of the rod 94. The reduction of the length of the rod 94 generates a driving force of closing the door 61, and the driving force is transmitted to the door 61. Thus, the door 61 is rotated about the hinge 62 and moves toward the closed position.

Next, in step S2, the controller 290 determines whether or not a detection signal is received from the sensor 260.

As described above, as the rod 220 approaches the sensor 260, the sensor 260 is actuated. In other words, when a foreign substance that will hamper the operation of closing the door 61 is present on the moving trajectory of the door 61, the foreign substance contacts the rod 220 and presses the rod 220, whereby the rod 220 is moved relative to the door 61, which actuates the sensor 260.

Therefore, if it is determined that a detection signal is received from the sensor 260 (YES in step S2), the procedure proceeds to step S3 where the controller 290 transmits to the actuator 91 a command signal which is different from the command signal for closing the door 61 output in step S1. The controller 290 outputs to the actuator 91 a command signal for halting the door 61. More specifically, the controller 290 outputs a command signal for halting the motion of the rod 94 to the actuator 91.

When the motion of the rod 94 is halted, the operation of closing the door 61 is halted. By halting the door 61, it is possible to prevent the foreign substance that comes into contact with the rod 220 from being sandwiched by the door 61.

Instead of halting the door 61, the door 61 may be controlled to move backward. The controller 290 may output a command signal to the actuator 91 to increase the protruding length of the rod 94, thereby generates a driving force to move the door 61 backward so as to open the door 61.

Subsequently, in step S4, the door 61 is released from halt. The controller 290 outputs a command signal to the actuator 91 again to decrease the protruding length of the rod 94. Thereby, the operation of closing the door 61 is resumed.

The process of step S4 may be executed after it is detected that a predetermined time has elapsed since the door 61 is halted in step S3. Alternatively, the process of step S4 may be executed when the operator operates the operation unit 70 and inputs a signal of closing the door 61 to the controller 290 again.

Next, in step S5, it is determined whether or not the door 61 is at the closed position. If it is determined in step S2 that the detection signal is not received from the sensor 260 (NO in step S2), the processes in steps S3 and S4 are not performed, and the determination in step S5 is performed immediately after step S2.

If it is determined that the door 61 is not at the closed position (NO in step S5), the procedure returns to step S2 where the controller 290 determines whether or not a detection signal is received from the sensor 260. If it is determined that the door 61 is at the closed position (YES in step S5), the operation of closing the door 61 is completed, and the procedure is ended.

[Function and Effects]

Next, the function and effects of the present embodiment will be described.

As illustrated in FIG. 2, the cab 30 according to the present embodiment includes an actuator 91 that generates a driving force to open and close the door 61, a rod 220 that is attached to the door 61 and rotatable relative to the door 61, and a sensor 260 that is attached to the door 61 separately from the rod 220. As illustrated in FIGS. 4 and 5, the sensor 260 detects the motion of the rod 220 relative to the door 61 by detecting the motion of the rod 220 relative to the sensor 260.

The rod 220 and the sensor 260 are separately attached to the door 61, and the motion of the rod 220 relative to the sensor 260 is detected as the motion of the rod 220 relative to the door 61. Different from that described above in PTL 1, the foreign substance detection device does not require an elastic member. Therefore, the detection accuracy of the foreign substance detection device is not degraded due to the deterioration of the elastic member in a severe environment. Therefore, the foreign substance detection device of the present embodiment has improved the durability in severe environments.

When the rod 220 comes into contact with a foreign substance, the rod 220 moves relative to the door 61 immediately, and the relative motion is detected by the sensor 260. In the configuration described above in PTL 1, although the elastic member is elastically deformed, the electrode may not deform immediately. In the foreign substance detection device according to the present disclosure, the sensor 260 is actuated as soon as the rod 220 comes into contact with a foreign substance, whereby the sensitivity of the foreign substance detection device is improved.

As illustrated in FIG. 4, the sensor 260 is disposed away from rod 220. This ensures that the rod 220 and the sensor 260 are separately attached to the door 61. In this case, as illustrated in FIG. 5, the sensor 260 may detect the motion of the rod 220 relative to the door 61 by detecting the motion of the rod 220 approaching the sensor 260.

As illustrated in FIGS. 1 and 2, the rod 220 is attached to the door 61 at a position away from the center of rotation of the door 61. Thus, it is possible to detect the presence of a foreign substance on the moving trajectory of the door 61 at a position away from the center of rotation of the door 61.

As illustrated in FIG. 2, the rod 220 is rotatable relative to the door 61. Thus, it is possible to detect the presence of a foreign substance by detecting the rotational motion of the rod 220 relative to the door 61.

As illustrated in FIG. 2, the center of rotation of the rod 220 relative to the door 61 is different from the center of rotation of the door 61. Thus, the rod 220 may be arranged at any position on the door 61, improving the degree of freedom in designing the rod 220.

As illustrated in FIG. 2, the rod 220 is attached to the inner surface 61A of the door 61. Thus, it is possible to detect the presence of a foreign substance on the moving trajectory of the door 61 during the operation of closing the door 61.

The rod 220 is made of a metal material. Since the rod 220 does not contain any elastic material such as rubber or soft synthetic resin, it is possible to improve the durability of the foreign substance detection device.

As illustrated in FIGS. 6 and 7, when the sensor 260 detects the motion of the rod 220 relative to the door 61 during the operation of closing the door 61, the controller 290 that controls the operation of opening or closing the door 61 transmits a command signal which is different from the signal for closing the door 61 to the actuator 91. By halting the operation of closing the door 61 when the presence of a foreign substance is detected, it is possible to prevent the foreign substance from being sandwiched.

As illustrated in FIG. 7, when the sensor 260 detects the motion of the rod 220 relative to the door 61 during the closing operation of the door 61, the controller 290 transmits a command signal for halting the door 61 to the actuator 91. By halting the door 61 when the presence of a foreign substance is detected, it is possible to reliably prevent the foreign substance from being sandwiched.

In the description of the present embodiment, a rod 220 which is a cylindrical bar bent at both ends has been described as an example of a movable member movable relative to the door 61. The movable member may be a plate member rotatably attached to the door 61 via a hinge. Further, the present disclosure is not limited to the example in which the rotational motion of the movable member relative to the door 61 is detected by the sensor 260, it is acceptable that a metal wire is adopted as the movable member, and the deformation of the wire may be detected when the wire comes into contact with a foreign substance.

In the present embodiment, as an example, it is described that the movable member and the sensor are attached to the inner surface 61A of the door 61. Instead of or in addition to the inner surface 61A of the door 61, a movable member and a sensor having the same configuration may be attached to the outer surface 61B of the door 61. In this way, it is possible to detect the presence of a foreign substance on the moving trajectory of the door 61 during the operation of opening the door 61, which makes it possible to prevent the foreign substance from being sandwiched between the door 61 and the left surface 34 of the cab 30.

FIG. 8 is a perspective view schematically illustrating a movable member and a sensor 260 mounted outside the door 61. In FIG. 8, a plate member 320 is attached to the outer surface 61B of the door 61 so as to be rotatable relative to the door 61 about a support 340. A dashed line extending in the vertical direction in FIG. 8 indicates the center of rotation of the plate member 320 relative to the door 61. In the example illustrated in FIG. 8, the plate member 320 corresponds to a movable member.

In the case where the movable member is attached to the outer surface 61B of the door 61, it is assumed that the movable member may come into contact with a foreign substance at a higher frequency and the movable member may be directly affected by an environment such as a high temperature environment, an acid environment, or an alkaline environment. Therefore, the movable member is suitably made of a hard material.

In the above embodiment, a cab 30 including an actuator 91, a rod 220 and a sensor 260, and a wheel loader 10 including the cab 30 have been described. The technical idea of the present embodiment may be applied to a retrofit kit that is retrofitted to a cab for a work machine which includes a manually openable and closable door so as to automate the manual door. The retrofit kit may include an actuator that generates a driving force to open and close the door, a movable member that is attached to the door and configured to be movable relative to the door, and a sensor that is attached to the door separately from the movable member and configured to detect the motion of the movable member relative to the door by detecting the motion of the movable member relative to the sensor.

It should be understood that the embodiments disclosed herein are illustrative and not restrictive in all respects. It is intended that the scope of the present disclosure is not limited to the description above but defined by the scope of the claims and encompasses all modifications equivalent in meaning and scope to the claims.

REFERENCE SIGNS LIST

10: wheel loader; 16: work implement; 30: cab; 31: cab body; 34: left surface; 37: floor; 39: doorway; 40: bracket; 61: door; 61A: inner surface; 61B: outer surface; 62: hinge; 70: operation unit; 91: actuator; 220: rod; 221: rod end; 230: plate; 240: rod support; 241: upper support; 242: lower support; 243: fixation member; 244: fixation portion; 245: support portion; 246: through hole; 248: torsion spring; 252: beta-shaped pin; 256: washer; 260: sensor; 261: sensor head; 270: cover; 290: controller; 291: memory; 320: plate member; 340: support

The invention claimed is:

1. A cab for a work machine, the cab comprising:
   a cab body that is formed with a doorway;
   a door that is rotatably supported on the cab body so as to open and close the doorway;
   an actuator that generates a driving force to open and close the door;
   a movable member that is attached to the door and movable relative to the door; and
   a sensor that is attached to the door separately from the movable member,
   the sensor detecting the motion of the movable member relative to the door by detecting the motion of the movable member relative to the sensor.

2. The cab for a work machine according to claim 1, wherein
   the sensor is disposed away from the movable member, and detects the motion of the movable member relative to the door by detecting the motion of the movable member approaching the sensor.

3. The cab for a work machine according to claim 1, wherein
   the movable member is attached to the door at a position away from a center of rotation of the door.

4. The cab for a work machine according to claim 1, wherein
the movable member is rotatable relative to the door.

5. The cab for a work machine according to claim 4, wherein
a center of rotation of the movable member relative to the door is different from a center of rotation of the door.

6. The cab for a work machine according to claim 1, wherein
the door has an inner surface facing an indoor space of the cab when the door is being closed, and
the movable member is attached to the inner surface.

7. The cab for a work machine according to claim 1, wherein
the movable member is made of a metal material.

8. The cab for a work machine according to claim 1, wherein
the cab further includes a controller that controls an operation of opening or closing the door,
the controller transmits a first signal for closing the door to the actuator, and transmits a second signal different from the first signal to the actuator when the sensor detects the motion of the movable member relative to the door.

9. The cab for a work machine according to claim 8, wherein
the second signal is a signal for halting the motion of the door.

10. A work machine comprising:
a work implement; and
a cab according to claim 1 where an operator who operates the work implement is seated.

11. An automatic opening/closing device that automatically opens and closes a door rotatably supported on a cab body of a work machine, comprising:
an actuator that generates a driving force to open and close the door;
a movable member that is attached to the door and movable relative to the door; and
a sensor that is attached to the door separately from the movable member so as to detect the motion of the movable member relative to the door.

\* \* \* \* \*